W. SHOMER & H. FRIEDMAN.
COMPOSITE CUSHIONING NON-INFLATABLE TIRE.
APPLICATION FILED OCT. 16, 1917.
1,263,947.
Patented Apr. 23, 1918.
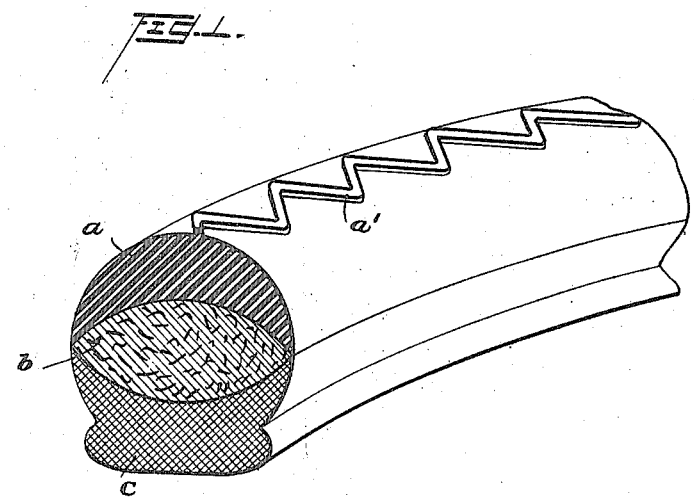
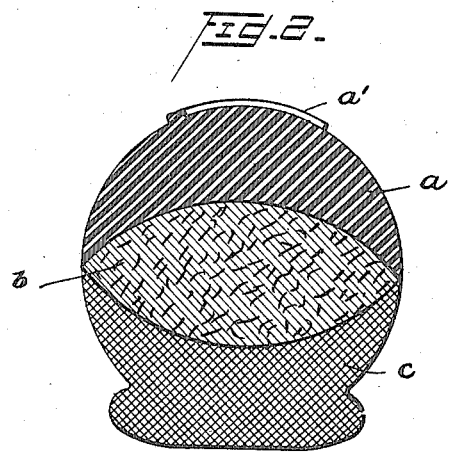

UNITED STATES PATENT OFFICE.

WILLIAM SHOMER AND HARRY FRIEDMAN, OF PHILADELPHIA, PENNSYLVANIA.

COMPOSITE CUSHIONING NON-INFLATABLE TIRE.

1,263,947.  Specification of Letters Patent.  Patented Apr. 23, 1918.

Application filed October 16, 1917. Serial No. 196,780.

*To all whom it may concern:*

Be it known that we, WILLIAM SHOMER and HARRY FRIEDMAN, both citizens of the United States, residing at the city of Philadelphia, in the county of Philadelphia and State of Pennsylvania, have jointly invented certain new and useful Improvements in a Composite Cushioning Non-Inflatable Tire for Automobiles, of which the following is a specification.

Our invention has relation to a composite airless and tubeless, non-inflatable, cushioning tire, for automobiles; and it particularly relates to the structural composition and arrangement of the tire, that is, comprising a non-skidding tread member composed of a dense or hard rubber; an intermediate cushioning member, composed of soft rubber, cork or similar material; and a base or felly member, composed of vulcanized fiber or other hard, more or less rigid material; and the several members combined by cementation to each other to constitute the airless and tubeless, non-inflatable cushioning tire, for the wheels of automobiles, trucks, cycles and other vehicles.

We are aware that composite tires have been constructed in many different forms prior to our invention and hence this invention is confined to the structural material composition and particular arrangement of the tire, as hereinbefore defined.

The nature and scope of our present invention will be more fully understood from the following description taken in connection with the accompanying drawings forming part hereof, in which—

Figure 1, is a fragmentary perspective view of an automobile tire, embodying the salient main features of our invention; and Fig. 2, is a transverse sectional view through the composite tire, showing the different sections in material composition and arrangement.

Referring to the drawings $a$, is the non-skidding tread member, composed of hard or dense rubber with a suitable non-skidding formation $a^1$, arranged integral with the tread portion thereof, as clearly shown in Fig. 1.

The intermediate section or member $b$, of the tire is composed of soft rubber, cork or other similar yielding material and as illustrated in Fig. 2, is of substantially egg-shape in form in cross-section. This member is cemented to the member $a$, so as to provide the maximum cushioning effect in the line of tread pressure, in the use of the tire.

The base or felly member $c$, is composed of vulcanized fiber or other similar dense or rigid material arranged to conform to the particular character or shape of felly to which it is to be fitted. The upper surface of the member $c$ is cemented to the member $b$. The three sections are thus of curved meeting surfaces, cemented to each other throughout these surfaces, with the maximum thickness of the outer section $a$, and of the intermediate section $b$ in line with the tread pressure, while section $c$ has its minimum thickness in such line. The section $c$ is of increased thickness in both directions beyond the line of tread pressure, so that this section, which is of comparatively rigid unyielding material, will resist thrust laterally, and thereby prevent separation of the tire parts under action.

Having thus described the nature and objects of our invention what we claim as new and desire to secure by Letters Patent is:—

A cushion tire including an outer, an intermediate and an inner section having curved meeting surfaces, and secured together throughout such surfaces, the outer section being of comparatively hard rubber and of maximum thickness in the line of tread pressure, the intermediate section being of comparatively soft resilient material and of substantially elliptical shape in cross section with the minor axis in said line of pressure, and the inner section being of fiber with its minimum thickness in the line of tread pressure, the said inner section being of increased thickness on opposite sides of such line of pressure.

In witness whereof, we have hereunto set our signatures this 10th day of October A. D. 1917, in the presence of the two subscribing witnesses.

WILLIAM SHOMER.
HARRY FRIEDMAN.

Witnesses:
J. WALTER DOUGLASS,
MARIAN GROOMS.